(12) United States Patent
Lee et al.

(10) Patent No.: US 12,394,848 B2
(45) Date of Patent: Aug. 19, 2025

(54) BATTERY MODULE AND BATTERY PACK INCLUDING THE SAME

(71) Applicant: LG Energy Solution, Ltd., Seoul (KR)

(72) Inventors: Changhun Lee, Daejeon (KR); Junyeob Seong, Daejeon (KR); Seok Jun Bang, Daejeon (KR); Min Seop Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 652 days.

(21) Appl. No.: 17/638,311

(22) PCT Filed: Mar. 11, 2021

(86) PCT No.: PCT/KR2021/003029
§ 371 (c)(1),
(2) Date: Feb. 25, 2022

(87) PCT Pub. No.: WO2021/221306
PCT Pub. Date: Nov. 4, 2021

(65) Prior Publication Data
US 2022/0302540 A1  Sep. 22, 2022

(30) Foreign Application Priority Data
Apr. 29, 2020  (KR) .................. 10-2020-0052264

(51) Int. Cl.
*H01M 50/264* (2021.01)
*H01M 50/211* (2021.01)
*H01M 50/502* (2021.01)

(52) U.S. Cl.
CPC ....... *H01M 50/211* (2021.01); *H01M 50/264* (2021.01); *H01M 50/502* (2021.01)

(58) Field of Classification Search
CPC . H01M 50/211; H01M 50/502; H01M 50/264
See application file for complete search history.

(56) References Cited

U.S. PATENT DOCUMENTS

2011/0293973 A1  12/2011  Kim
2012/0114999 A1  5/2012  Park et al.
(Continued)

FOREIGN PATENT DOCUMENTS

CN  102263212 A  11/2011
CN  106941142 A  7/2017
(Continued)

OTHER PUBLICATIONS

International Search Report for Application No. PCT/KR2021/003029 mailed Jul. 7, 2021, pp. 1-3.
(Continued)

*Primary Examiner* — James Lee
(74) *Attorney, Agent, or Firm* — Lerner David LLP

(57) ABSTRACT

The present disclosure relates to a battery module and a battery pack including the same. A battery module according to an embodiment of the present disclosure may includes a battery cell stack in which a plurality of battery cells are stacked, a module frame arranged so as to wrap the battery cell stack, a busbar frame arranged so as to cover the front and rear surfaces of the battery cell stack that is exposed from the module frame, and an end plate arranged so as to cover the busbar frame. The module frame may includes a lower frame for covering the lower part and both side surfaces of the battery cell stack, and an upper plate for covering the upper part of the battery cell stack. At least one assembly guide part may be formed at an edge of the lower frame coupled to the upper plate.

8 Claims, 7 Drawing Sheets

(56) References Cited

U.S. PATENT DOCUMENTS

| | | |
|---|---|---|
| 2014/0242449 A1 | 8/2014 | Lee et al. |
| 2015/0037619 A1 | 2/2015 | Ahn |
| 2017/0110698 A1 | 4/2017 | Kim et al. |
| 2017/0190264 A1* | 7/2017 | Kim .................... H01M 50/242 |
| 2019/0001838 A1 | 1/2019 | Choi et al. |
| 2019/0131596 A1 | 5/2019 | Yang et al. |
| 2019/0198952 A1 | 6/2019 | Choi et al. |
| 2020/0076025 A1 | 3/2020 | Jo et al. |
| 2020/0176745 A1 | 6/2020 | Lee |
| 2022/0231372 A1 | 7/2022 | Kim |

FOREIGN PATENT DOCUMENTS

| | | |
|---|---|---|
| CN | 108463902 A | 8/2018 |
| CN | 109920944 A | 6/2019 |
| CN | 110915019 A | 3/2020 |
| JP | 2014-170740 A | 9/2014 |
| JP | 2015138620 A | 7/2015 |
| KR | 20070080870 A | 8/2007 |
| KR | 101191659 B1 | 10/2012 |
| KR | 20150014846 A | 2/2015 |
| KR | 20160071900 A | 6/2016 |
| KR | 20170045580 A | 4/2017 |
| KR | 2017-0082041 A | 7/2017 |
| KR | 20190054709 A | 5/2019 |
| KR | 20190078521 A | 7/2019 |
| KR | 20190090189 A | 8/2019 |
| KR | 102120933 B1 | 6/2020 |
| WO | 2017169728 A1 | 10/2017 |
| WO | 2019098491 A1 | 5/2019 |

OTHER PUBLICATIONS

Extended European Search Report for Application No. 21797487.2 dated May 16, 2023. 7 pgs.

* cited by examiner

[FIG. 1]
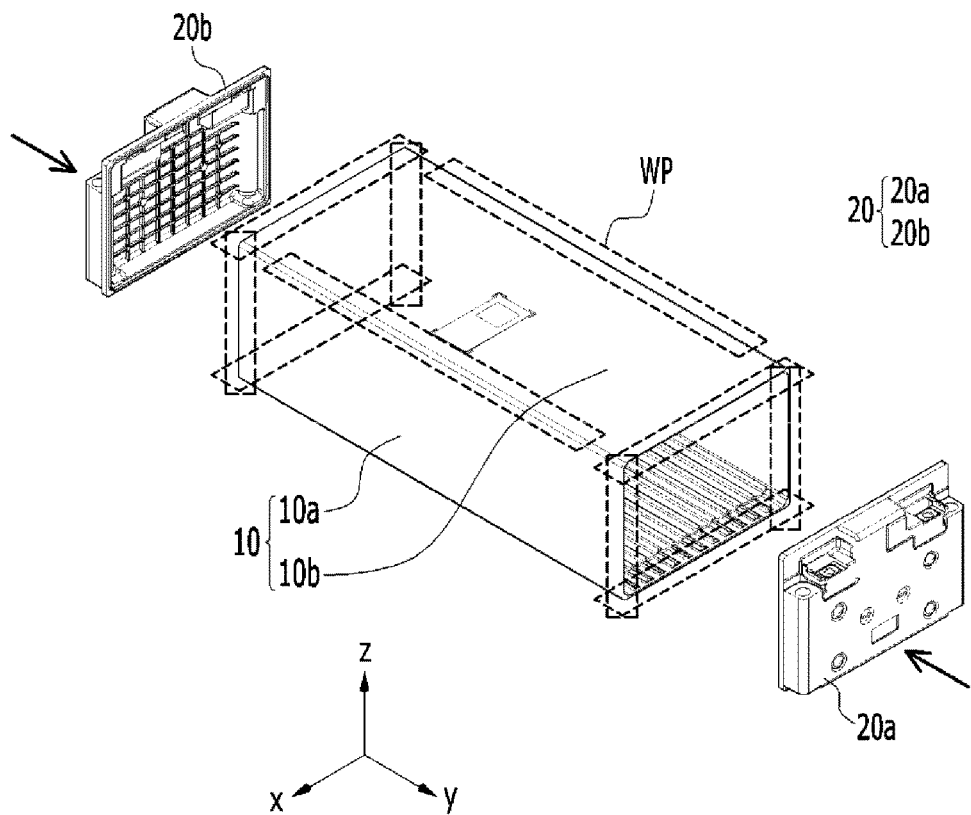
[FIG. 2]
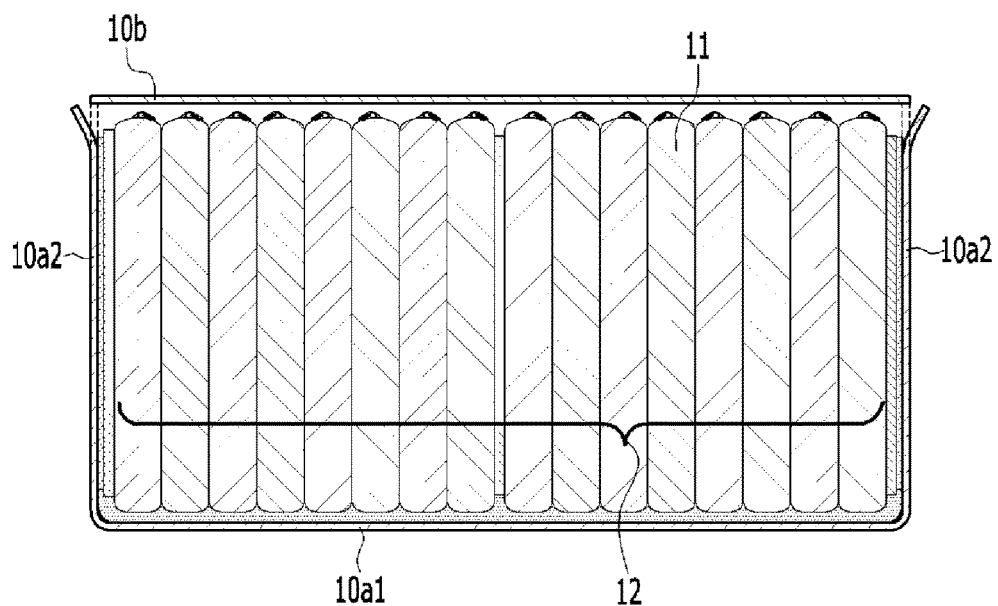

[FIG. 3]
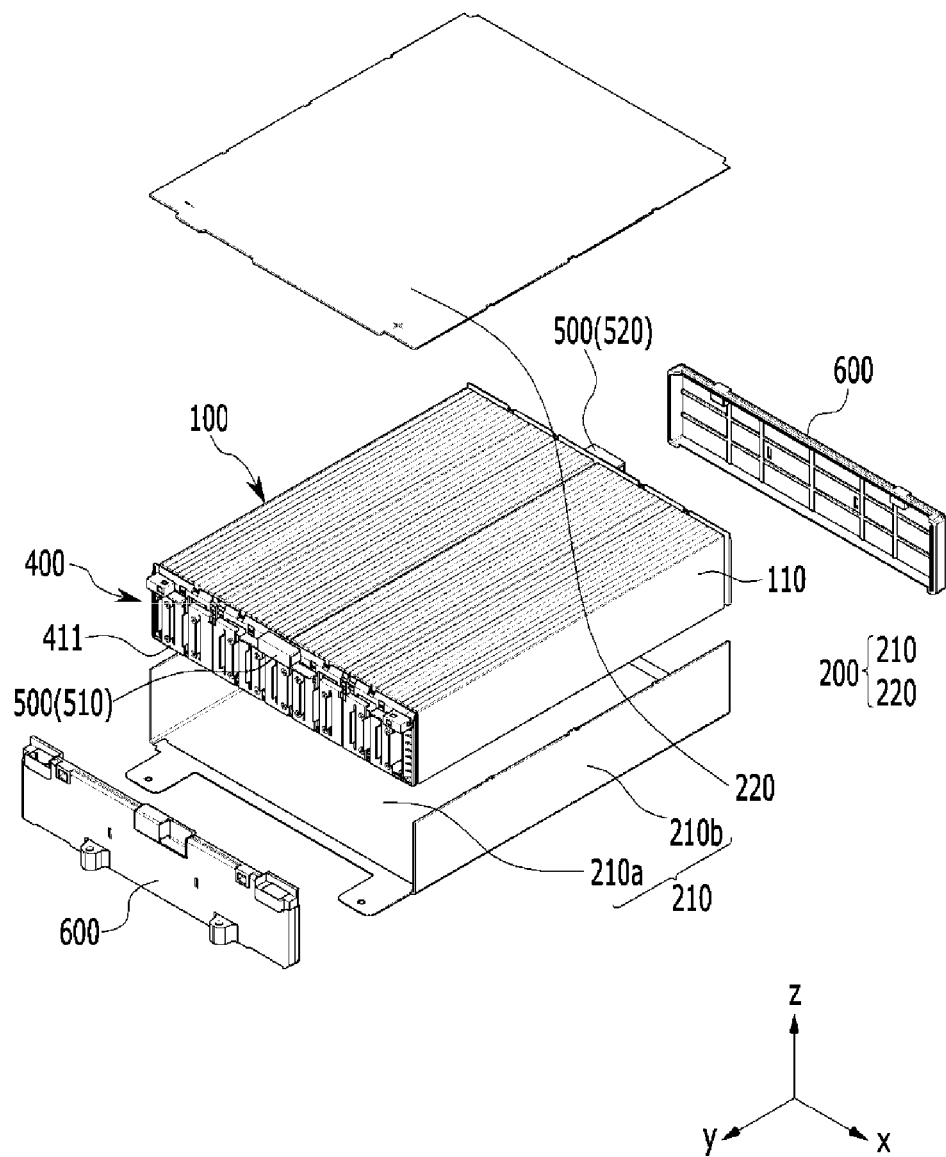

[FIG. 4]
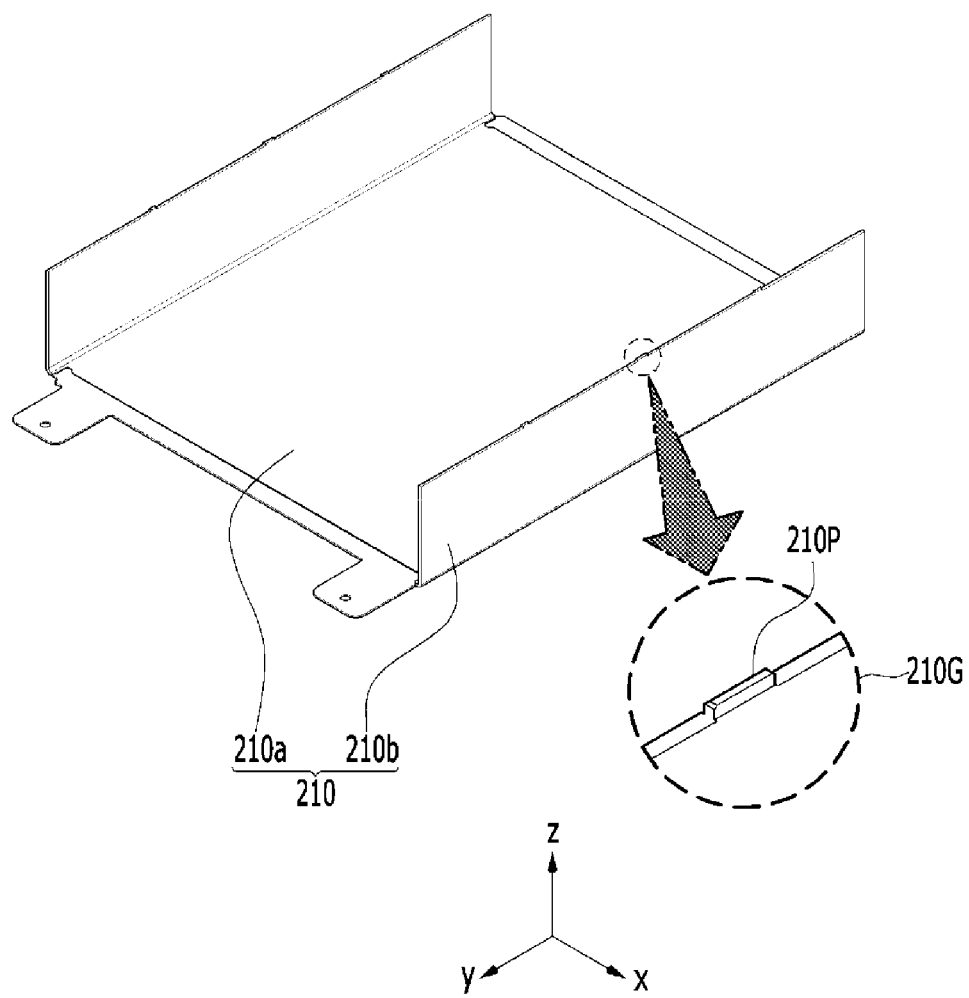

[FIG. 5]
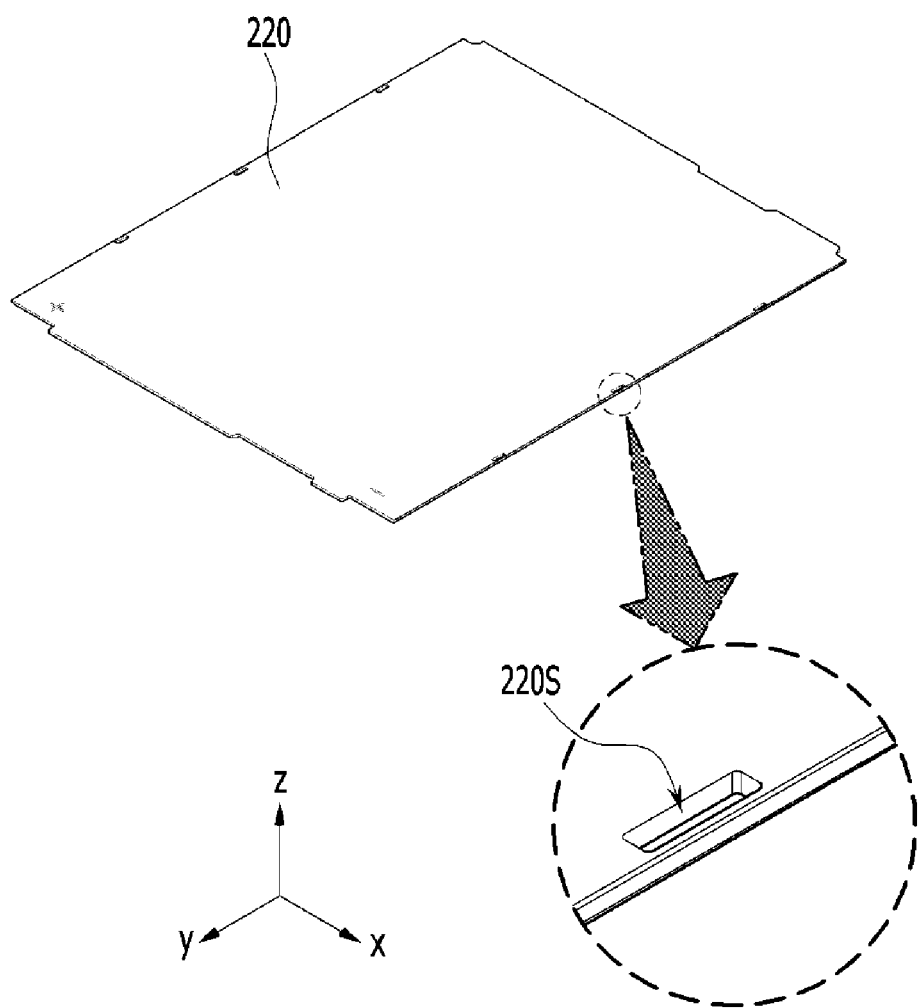

[FIG. 6]
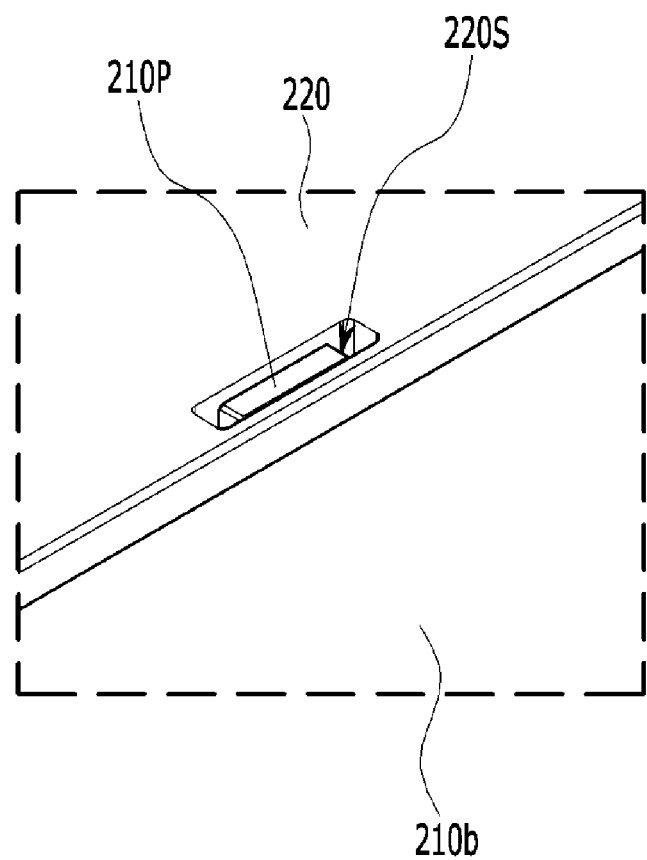

[FIG. 7]
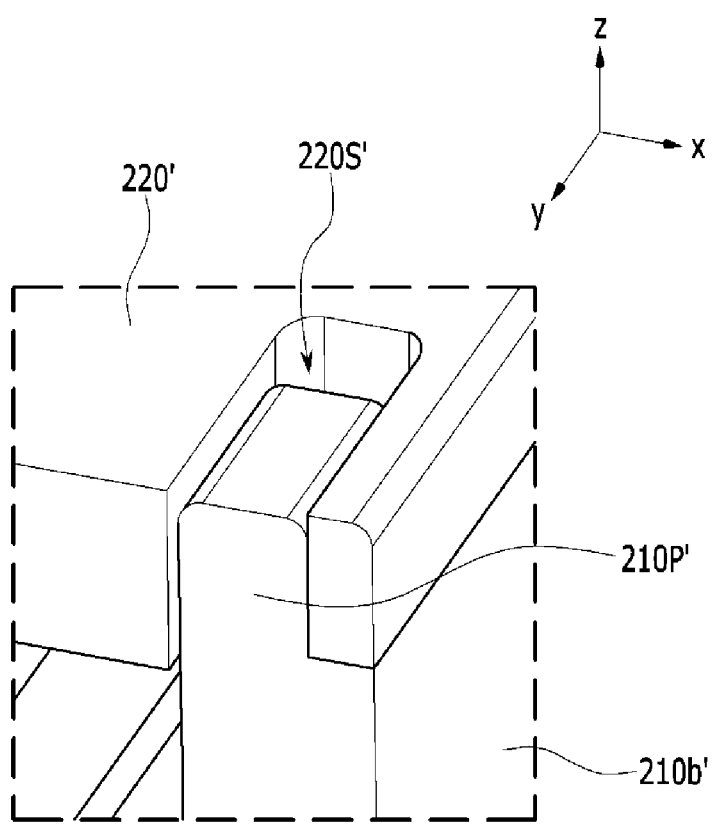

【FIG. 8】
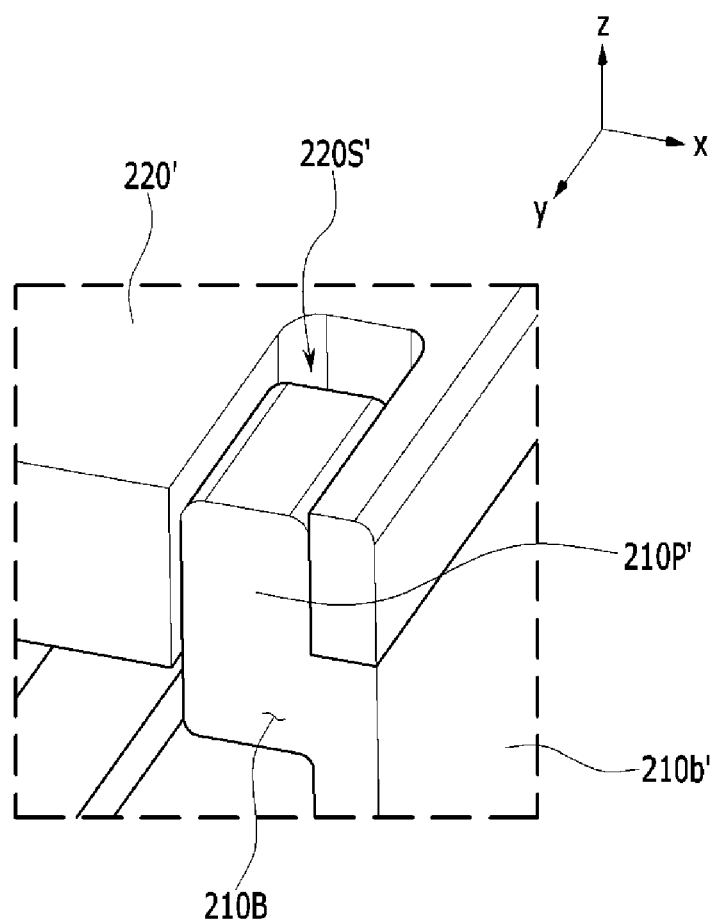

BATTERY MODULE AND BATTERY PACK INCLUDING THE SAME

CROSS CITATION WITH RELATED APPLICATION(S)

This application is a national phase entry under 35 U.S.C. § 371 of International Application No. PCT/KR2021/003029 filed on Mar. 11, 2021, which claims the benefit of Korean Patent Application No. 10-2020-0052264 filed on Apr. 29, 2020, with the Korean Intellectual Property Office, the disclosures of which are incorporated herein by reference in their entirety.

TECHNICAL FIELD

The present disclosure relates to a battery module and a battery pack including the same, and more particularly, to a battery module having an improved assembling property, and a battery pack including the same.

BACKGROUND ART

Secondary batteries, which are easily applicable to various product groups and have electrical characteristics such as high energy density, are universally applied not only for a portable device but also for an electric vehicle or a hybrid electric vehicle, an energy storage system or the like, which is driven by an electric driving source. Such secondary batteries are attracting attention as a new environment-friendly energy source for improving energy efficiency since they provide a primary advantage of remarkably reducing the use of fossil fuels and also does not generate by-products from the use of energy at all.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. For this reason, a prismatic battery, a pouch-shaped battery or the like, which can be stacked with high integration and has a small weight relative to capacity, is usually used as a battery cell of the middle or large-sized battery module. Meanwhile, in order to protect the battery cell stack from external impact, heat or vibration, the battery module may include a module frame in which a front surface and rear surface are opened to house the battery cell stack in an internal space.

FIG. 1 is a perspective view illustrating a battery module having a module frame according to the related art. FIG. 2 is a view illustrating a cross-sectional view taken along the xz plane of FIG. 1.

Referring to FIGS. 1 and 2, the battery module may include a module frame 10 of which a front surface and a rear surface are opened so as to cover the battery cell stack 12 formed by stacking a plurality of battery cells 11, and end plates 20 arranged to cover the front surface and the rear surface of the module frame 10. The module frame 10 may include a U-shaped frame 10a and an upper plate 10b for covering an open upper part of the U-shaped frame 10a. The U-shaped frame 10a may include a bottom part 10a1 for covering the lower surface of the battery cell stack 12, and two side surface parts 10a2 having a structure protruding upward from both sides of the bottom part 10a1. The end plate 20 may include a front plate 20a for covering one side of the module frame 10, and a rear plate 20b for covering the other side of the module frame 10.

In order to form such a battery module, in a state in which the battery cell stack 12 is mounted inside the module frame 10, welding or the like can be performed in order to couple the U-shaped frame 10a and the upper plate 10b of the module frame 10. At this time, assembly defects may occur in the assembly process in which the upper plate 10b is placed on the U-shaped frame 10a. In particular, when a welding part ("WP") is formed between the upper plate 10b and the side surface part of the U-shaped frame 10a, a guide for assembly alignment may be absent, which may cause defects. In particular, as shown in FIG. 2, due to the thickness tolerance of the battery cell 11, the side surface part 10a2 of the U-shaped frame 10a is widened and thus, there is a high possibility that assembly defects occur.

Therefore, there is a need to develop a technique capable of solving these problems involved in the prior art.

DETAILED DESCRIPTION OF THE INVENTION

Technical Problem

It is an object of the present disclosure to provide a battery module having an improved assembling property, and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells are stacked, a module frame arranged so as to wrap the battery cell stack, a busbar frame arranged so as to cover the front and rear surfaces of the battery cell stack that is exposed from the module frame, and an end plate arranged so as to cover the busbar frame, wherein the module frame includes a lower frame for covering the lower part and both side surfaces of the battery cell stack, and an upper plate for covering the upper part of the battery cell stack, and wherein at least one assembly guide part is formed at an edge of the lower frame coupled to the upper plate.

The lower frame may include a bottom part supporting the lower part of the battery cell stack, and two side surface parts extending upward from both ends of the bottom part, and the assembly guide part may be formed at an upper edge of the side surface part.

The assembly guide part may include a protrusion-shaped support part that protrudes in in one direction.

A groove part in which the support part of the assembly guide part is assembled may be formed in the upper plate.

A width of the side surface part may be wider than a width of the support part.

The groove part may have a structure in which one side edge of the edge of the upper plate is opened.

The support part may be formed on one side of the edge of the side surface part in the horizontal direction.

The support part may include a bending part.

The bending part may be bent in a direction in which the support part protrudes and is connected to the side surface part.

According to one embodiment of the present disclosure, there is provided a battery pack comprising the above-mentioned battery module.

Advantageous Effects

According to embodiments of the present disclosure, a slot-type assembly guide structure is formed on the module frame, thereby capable of preventing misalignment when assembling the module frame. Through such improvement of the assembling property, it is possible to prevent welding defects from occurring when the module frame is coupled by welding.

BRIEF DESCRIPTION OF THE DRAWINGS

FIG. 1 is a perspective view illustrating a battery module having a module frame according to the related art;

FIG. 2 is a cross-sectional view taken along a plane x-z of FIG. 1;

FIG. 3 is an exploded perspective view illustrating a battery module according to an embodiment of the present disclosure;

FIG. 4 is a perspective view illustrating a lower frame of the battery module of FIG. 3;

FIG. 5 is a perspective view illustrating an upper plate of the battery module of FIG. 3;

FIG. 6 is a partial perspective view illustrating an assembling part of a battery module according to an embodiment of the present disclosure;

FIG. 7 is a partial perspective view illustrating an assembling part of a battery module according to another embodiment of the present disclosure; and FIG. 8 is a partial perspective view illustrating an assembling part of a battery module according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 3 is an exploded perspective view illustrating a battery module according to an embodiment of the present disclosure.

Referring to FIG. 3, the battery module according to an embodiment of the present disclosure includes a battery cell stack 100 in which a plurality of battery cells 110 are stacked, a module frame 200 arranged so as to wrap the battery cell stack 100, a busbar frame 400 arranged so as to cover the front and rear surfaces of the battery cell stack 100, and an end plate 600 arranged so as to cover the outside of the busbar frame 400 on the basis of the battery cell stack 100.

The battery cell 110 according to the embodiment of the present disclosure is a secondary battery and may be configured as a pouch-type secondary battery. Such a battery cell 110 may be composed of a plurality of cells, and the plurality of battery cells 110 may be stacked together so as to be electrically connected to each other, thereby forming the battery cell stack 100. The plurality of battery cells 110 may include an electrode assembly, a cell case, and an electrode lead protruding from the electrode assembly, respectively.

A busbar 411 and a connector 500 may be mounted on the busbar frame 400. The connector 500 can sense voltage and temperature from busbars or thermistors mounted on the busbar frame 400 and transmit them to a battery management system (BMS). Among the busbar frames 400 formed on the front and rear surfaces of the battery cell stack 100, a first connector 510 is formed in the busbar frame 400 located on the front surface of the battery cell stack 100, and a second connector 520 may be formed on the busbar frame 400 located on the rear surface of the battery cell stack 100.

Conventionally, the connector is formed only in one busbar frame part among the two busbar frames formed on the front and rear surfaces of the battery cell stack 100, and the busbar frame part where the connector has not been formed transmits voltage and temperature sensing information to the connector located on the opposite side of the battery cell stack through a flexible flat cable. At this time, since the flexible flat cable is located on the upper side of the battery cell stack, a step of assembling the flexible flat cable and a step of confirming whether there is a problem in connection through the flexible flat cable were separately required.

According to an embodiment of the present disclosure, the first and second connectors 510 and 520 are separately formed on each side of the busbar frames 400 formed on the front and rear surfaces of the battery cell stack 100, whereby the voltage and temperature sensed through the connector formed on each busbar frame 400 can be transmitted to the BMS in both directions without the need to separately assemble the flexible flat cable. Through this, the manufacturing cost of the battery module can be reduced and the battery module structure can be simplified. In addition, the process of assembling the flexible flat cable and the process of confirming poor connection can be eliminated, and the manufacturing process of the battery module can be simplified.

The battery cell stack 100 is disposed in the module frame 200. According to the embodiment of the present disclosure, the module frame 200 includes a lower frame 210 that covers the lower surface and both side surfaces of the battery cell stack 100, and an upper plate 220 that covers the upper surface of the battery cell stack 100.

In a state in which the busbar frame 400 is mounted on the front and rear surfaces of the battery cell stack 100, the battery cell stack 100 may be disposed on the lower frame 210. Thereafter, the upper plate 220 may be assembled so as to cover the upper part of the battery cell stack 100. At this time, the battery cell stack 100 can be stably arranged in the inside of the module frame 200 through the fixing of the upper plate 220 and the lower frame 210.

The lower frame 210 of the module frame 200 that houses the battery cell stack 100 may be a U-shaped frame. The U-shaped frame 210 may include a bottom part 210a and two side surface parts 210b extending upward from both ends of the bottom part 210a. The bottom part 210a may cover the lower surface (the direction opposite to the z-axis) of the battery cell stack 100, and the side surface part 210b may cover both side surfaces (x-axis direction and direction opposite to the same) of the battery cell stack 100.

The upper cover plate 220 may be formed in a single plate-shaped structure that wraps the lower surface wrapped by the U-shaped frame 210 and the remaining upper surface (z-axis direction) excluding both side surfaces. The upper cover plate 220 and the U-shaped frame 210 can be coupled by welding or the like in a state in which the corresponding edge portions are in contact with each other, thereby forming a structure that covers the battery cell stack 120 vertically and horizontally. The battery cell stack 120 can be physically protected through the upper cover plate 220 and the U-shaped frame 210. For this purpose, the upper cover plate 220 and the U-shaped frame 210 may include a metal material having a predetermined strength.

As described previously with reference to FIGS. 1 and 2, in a state in which the battery cell stack 100 is mounted inside the module frame 200, welding or the like can be performed in order to couple the U-shaped frame 210 and the upper plate 220 of the module frame 200. At this time, in order to form a welded part, it is necessary to fix the U-shaped frame 210 and the upper plate 220 so that the coupling surfaces of the side surface part 210b and the upper plate 220 of the U-shaped frame 210 are located to correspond to each other. However, there is a limit to fixing the U-shaped frame 210 and the upper plate 220 so that they closely correspond to each other, which causes a problem that the welding is not smoothly performed.

Further, a laser welding may be performed for welding, and internal parts including battery cells may be damaged due to the laser itself or weld spatters penetrated during the welding process. At this time, if an assembly defect occurs in the assembling process in which the upper plate 220 is placed on the U-shaped frame 210, the welding line may also be misaligned, which results in the welding defects. In addition, much more welding spatter flows into the battery module where the battery cells are located, which may cause a bigger problem.

In order to reduce these problems, the battery module according to the embodiment of the present disclosure includes a lower frame having a slot-type assembly guide structure, whereby the assembling property of the lower frame and the upper plate can be improved and the welding defects can be prevented accordingly. This will be described in detail with reference to FIGS. 4 to 6.

FIG. 4 is a perspective view illustrating a lower frame included in the battery module of FIG. 3. FIG. 5 is a perspective view illustrating an upper plate included in the battery module of FIG. 3. FIG. 6 is a partial perspective view illustrating the assembling part of the upper plate and the lower frame in the battery module according to an embodiment of the present disclosure.

Referring to FIG. 4, an assembly guide part 210G may be formed at the upper edge of the side surface part 210b of the U-shaped frame 210 according to the embodiment of the present disclosure. At least one assembly guide part 210G may be formed at an upper end edge of the side surface part 210b of the U-shaped frame 210. The plurality of assembly guide parts 210G may be formed so as to be separated from each other while having a predetermined interval.

The assembly guide part 210G according to the embodiment of the present disclosure may include a protrusion-shaped support part 210P that protrudes in the z-axis direction.

Referring to FIG. 5, a groove part 220S corresponding to the assembly guide part 210G formed in the U-shaped frame 210 may be formed in the upper plate 220 according to the embodiment of the present disclosure. The groove part 220S can have a structure that penetrates the upper plate 220 in the z-axis direction from an adjacent portion at the both edges of the upper plate 220 so that the assembly guide part 210G of the U-shaped frame 210 can be assembled with the upper plate 220. The groove part 220S may be formed in a shape corresponding to the support part 210P of the assembly guide part 210G, and can have various shapes such as a rectangle and a circle.

Referring to FIGS. 5 and 6, the support part 210P formed on the side surface part 210b of the lower frame 210 can be inserted into the groove part 220S formed on the upper plate 220. The width of the support part 210P defined along the x-axis direction may be narrower than the width of the side surface part 210b of the lower frame 210 defined along the x-axis direction, so that assembly is performed in a state where the side surface part and one side surface of the upper plate are aligned. The x-axis direction used herein may be the same as the direction in which the battery cells 110 of FIG. 3 are stacked, the y-axis direction may be perpendicular to the direction in which the battery cells 110 are stacked, and the z-axis direction may be perpendicular to the xy plane.

According to the embodiment of the present disclosure, by fixing the positions in the x-axis direction and the y-axis direction, not only the assembling property but also the durability of the battery module can be improved.

As shown in FIG. 3, in the case of a large-area module in which the number of battery cells 110 stacked as in the battery cell stack 100 according to an embodiment of the present disclosure is larger than the number of battery cells 11 in the battery cell stack 12 shown in FIG. 2, the horizontal direction length of the battery module is increased. The large area module has a structure in which the horizontal direction length of the battery module is increased, so that the load from the central part becomes large and the possibility of bending deformation becomes high. Here, the length in a horizontal direction may mean a length in a direction in which the battery cells are stacked. Due to the bending deformation, the coupling structure of the U-shaped frame 210 and the upper plate 220 may be misaligned depending on the usage conditions of the battery module, but according to the embodiment of the present disclosure, the coupling holding force of the U-shaped frame 210 and the upper plate 220 can be improved by strongly fixing the positions in the two directions of the x-axis direction and the y-axis direction.

Referring back to FIG. 3, the battery module according to the embodiment of the present disclosure may further include an end plate 600 arranged to cover the front and rear surfaces of the battery cell stack 100. The battery cell stack 100 arranged inside can be physically protected via the module frame 200 described above. The end plate 600 may be located on the front surface (y-axis direction) and the rear surface (y-axis direction) of the battery cell stack 100. The end plate 600 is formed so as to cover the battery cell stack 100, and can physically protect the battery cell stack 100 and other electrical components from external impact.

Meanwhile, although not specifically illustrated, the busbar frame 400 to which the busbar 411 is mounted, and an insulating cover for electrical insulation, etc. may be located between the battery cell stack 100 and the end plate 600.

FIG. 7 is a partial perspective view illustrating an assembling part of an upper plate and a lower frame in a battery module according to another embodiment of the present disclosure.

Referring to FIG. 7, the side surface part 210b' of the lower frame may be partially machined to form the side surface part 210b'' having an L-shaped cross-section cut on the yz plane. The side surface part 210b' is an assembly guide part, which may include a protrusion-shaped support part 210P' formed at an upper edge of the side surface part 210b'. In the upper plate 220' according to the embodiment of the present disclosure, a groove part 220S' is formed on one side in the y-axis direction, and the groove part 220S' may have a structure in which one side in the y-axis direction is opened. In other words, the groove part 220S' can be opened at one side edge of the upper plate 220'.

The support part 210P' according to the embodiment of the present disclosure may be formed on one side of the side surface part 210b' in the y-axis direction. The support part 210P' may be assembled into the groove part 220S' of the upper plate 220' while moving the side surface part 210b' in a direction opposite to the y-axis. At this time, the assembly may be performed in a state where the side surface part 210b' and one side surface of the upper plate 220' are aligned with each other. In other words, the support part 210P' may be formed on one side of the edge in the horizontal direction of the side surface part 210b'. Here, the horizontal direction may be the same as the y-axis direction.

FIG. 8 is a partial perspective view illustrating the assembling part of the upper plate and the lower frame in the battery module according to another embodiment of the present disclosure.

The embodiment of FIG. 8 is almost the same as the embodiment of FIG. 7, and only parts having differences will be described below. Except for the following differences, all the contents described in the embodiment of FIG. 7 can be applied to the embodiments of the present disclosure.

Referring to FIG. 8, the side surface part 210b' of the lower frame according to the embodiment of the present disclosure may include a support part 210P' having a bending part 210B through a bending work. The bending part 210B may be bent in a direction in which the support part 210P' protrudes to be connected to the side surface part 210b'. The side surface part 210b' is as an assembly guide part, which may include a protrusion-shaped side support part 210P' formed at the upper edge of the side part 210b'. In the upper plate 220' according to the embodiment of the present disclosure, a groove part 220S' is formed on one side in the y-axis direction, and the groove part 220S' may have a structure in which one side in the y-axis direction is opened.

The support part 210P' according to the embodiment of the present disclosure may be formed on one side of the side part 210b' in the y-axis direction, and the support part 220P' may be assembled into the groove part 220S' of the upper plate 220' while moving the side surface part 210b' in the direction opposite to the y-axis. At this time, the assembly may be performed in a state that the side surface part 210b' and one side of the upper plate 220' are aligned with each other.

Meanwhile, one or more of the battery modules according to embodiments of the present disclosure can be packaged in a pack case to form a battery pack. The battery pack can be mounted together with various control and protection systems such as a battery management system (BMS) and a cooling system to form a battery pack.

The above-mentioned battery module or the battery pack including the same can be applied to various devices. These devices can be applied to vehicle means such as an electric bike, an electric vehicle, and a hybrid electric vehicle, and may be applied to various devices capable of using a secondary battery, without being limited thereto.

Although preferred embodiments of the present disclosure has been described above, the scope of the present disclosure is not limited thereto and modifications and improvements made by those skilled in the part by using the basic concept of the present disclosure, which are defined in the following claims, also belong to the scope of the present disclosure.

DESCRIPTION OF REFERENCE NUMERALS

200: module frame
210: lower frame
210G: assembly guide part
210P: support part
220: upper plate
220S: groove part

The invention claimed is:

1. A battery pack comprising:
a battery cell stack including a plurality of stacked battery cells, the battery cell stack including a lower surface and an upper surface on an opposite side and side surfaces extending therebetween, and
a busbar frame arranged to cover at least one surface of the battery cell stack,
wherein the battery cell stack comprises a lower frame to cover the lower surface and the side surfaces, and an entirely flat upper plate for covering the upper surface, and
wherein at least one assembly guide part is formed at an edge of the lower frame, the at least one assembly guide part including a support part that protrudes from the lower frame, the support part being configured to be received in a groove part of the upper plate to couple the lower frame to the upper plate, the groove part being defined by an opening extending through the upper plate.

2. The battery pack of claim 1, wherein the lower frame comprises a bottom part to support the lower surface, and two side surface parts extending upward from both ends of the bottom part, the assembly guide part being formed at an upper edge of at least one of the side surface parts.

3. The battery pack of claim 2, wherein the support part protrudes from the upper edge.

4. The battery pack of claim 3, wherein a width of the side surface part is wider than a width of the support part.

5. The battery pack of claim 3, wherein the opening extends through an edge of the upper plate.

6. The battery pack of claim 5, wherein the support part comprises a bending part.

7. The battery pack of claim 6, wherein the bending part is bent in a direction along which the support part protrudes, the bending part being connected to the side surface part.

8. The battery pack of claim 1 further comprising a battery module.

* * * * *